United States Patent Office.

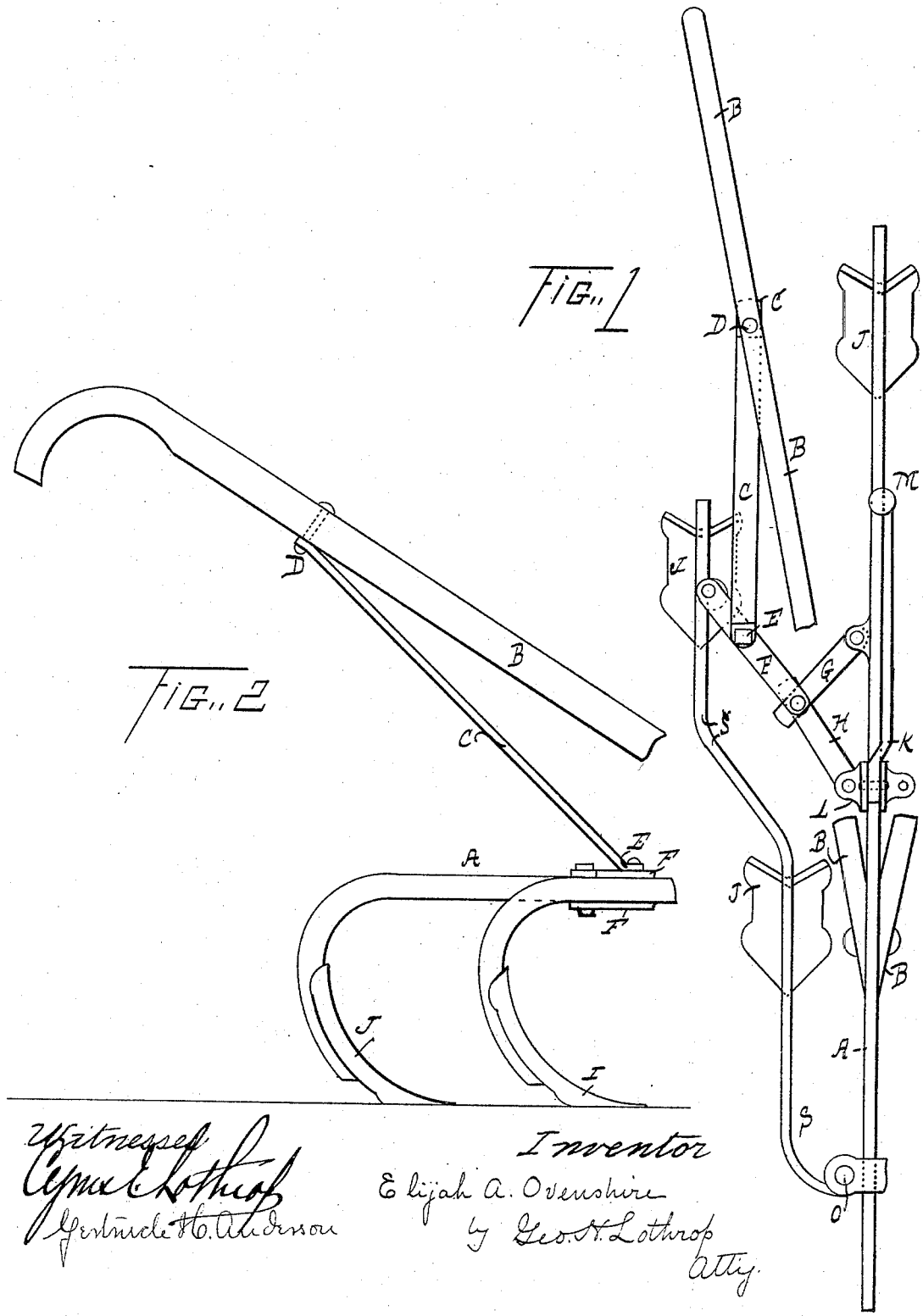

ELIJAH A. OVENSHIRE, OF LANSING, MICHIGAN, ASSIGNOR TO THE
E. BEMENT & SONS, OF MICHIGAN.

CULTIVATOR.

SPECIFICATION forming part of Letters Patent No. 492,307, dated February 21, 1893.

Application filed March 29, 1892. Serial No. 426,898. (No model.)

*To all whom it may concern:*

Be it known that I, ELIJAH A. OVENSHIRE, of Lansing, in the county of Ingham and State of Michigan, have invented a new and useful Improvement in Cultivators, of which the following is a specification.

My invention consists in an improvement in cultivators, hereinafter fully described and claimed.

Figure 1 is a plan view of half of a cultivator, embodying my invention, and Fig. 2 is a side elevation of a portion thereof.

The cultivator to which my invention is shown as applied, is of the class in which the frame is jointed, so that the side bars can be spread in or out from the center bar to widen or narrow the track of the machine.

A represents the center bar and S represents one of the side bars, pivoted at the point O to a clip on bar A.

L represents a sliding clip on center bar A, to which is pivoted a link K connected with a lever M, fulcrumed on bar A, by means of which the clip L is forced forward or backward on the center bar A.

G and F represent the two arms of a toggle joint, the arm G being pivoted to the center bar A, and the arm F to the side bar S.

H represents a pivoted link connecting the clip L with the center of the toggle joint F, G, and when clip L is moved on center bar A, it opens or closes the toggle joint F, G, by means of link H, and thereby spreads side bar S away from or draws it toward, center bar A.

B B represent the handles of the cultivator secured to center bar A.

With this form of construction it follows that in all positions of the side bar, the machine is more or less rickety because of the number of joints between the bars. To obviate this is the object of my invention, and I do this in the following manner: C represents a brace which is pivoted at D to one of the handles B and is pivoted at its other end at the point E to the arm F of the toggle-joint F, G, so that it connects points D and E rigidly as to longitudinal movement, and yet permits the side bar S to move in and out, because the point E moves toward the point D at the same time that it moves away from center bar A. One of these braces C is connected with each handle B and with the toggle arm F, the connection on the other side of the machine being exactly the same as that shown in Fig. 1. These braces C add great rigidity to the machine and are valuable in its operation.

This invention is shown and described as applied to cultivators, but may be applied to other machines, and I do not wish to be limited solely to cultivators.

What I claim as my invention, and desire to secure by Letters Patent, is—

1. In a machine having a center bar, handles secured thereto, and a side bar pivoted to the center bar and provided with means for moving said side bar, a rigid diagonal brace pivoted at one end to the handle, and at the other end to the side bar spreading mechanism, substantially as shown and described.

2. The combination with a center bar, handles secured thereto, a side bar pivoted to the center bar, and toggle joint mechanism connecting the center bar with the side bar for spreading the latter, of a rigid diagonal brace pivoted at its upper end to the handle and at its lower end to the toggle joint spreading mechanism, for bracing the toggle joint mechanism, substantially as and for the purposes described.

3. The combination with the center bar A, handles B secured thereto, side bars S pivoted to said center bar, toggle joint F, G, clip L and link H, of the brace C, pivoted at one end to handle B and at the other end to toggle joint arm F, substantially as shown and described.

4. The combination of the center bar A, side bar S pivoted thereto, toggle joint F, G, connecting said center and side bar, a handle secured to said center bar, and a diagonal brace pivoted at one end to said handle and at the other end to said toggle joint, substantially as shown and described.

ELIJAH A. OVENSHIRE.

Witnesses:
RUDOLPH SHOEMAKER,
S. M. GLEASON.